(12) United States Patent　　(10) Patent No.:　US 12,670,485 B2

Katsumata　　(45) Date of Patent:　Jun. 30, 2026

(54) POINT OF SALE SYSTEM, STORE SYSTEM, AND METHOD

(71) Applicant: Toshiba Tec Kabushiki Kaisha, Tokyo (JP)

(72) Inventor: Hiroyuki Katsumata, Numazu (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 33 days.

(21) Appl. No.: 18/583,715

(22) Filed: Feb. 21, 2024

(65) Prior Publication Data

US 2024/0320649 A1　　Sep. 26, 2024

(30) Foreign Application Priority Data

Mar. 24, 2023　(JP) ................................. 2023-048746

(51) Int. Cl.
　*G06Q 20/20*　　　(2012.01)
(52) U.S. Cl.
　CPC .................................. *G06Q 20/202* (2013.01)
(58) Field of Classification Search
　CPC ..... G06Q 20/202; G06Q 50/12; G06Q 10/087
　See application file for complete search history.

(56) References Cited

U.S. PATENT DOCUMENTS 10,121,133 B2 * 11/2018 Nelms ................ G06Q 30/0633

FOREIGN PATENT DOCUMENTS

JP　　　2022-025910 A　　　2/2022

OTHER PUBLICATIONS

Japanese Office Action dated Jan. 20, 2026, mailed in counterpart Japanese Application No. 2023-048746, 10 pages (with translation).

* cited by examiner

*Primary Examiner* — Ariel J Yu
*Assistant Examiner* — Denisse Y Ortiz Roman
(74) *Attorney, Agent, or Firm* — Kim & Stewart LLP

(57)　　　　ABSTRACT

A point of sale (POS) system includes a POS server configured to manage sales data of a store, and a plurality of POS terminals installed in the store and configured to perform processing for commercial transactions at the store and transmit data of the commercial transactions to the POS server. One of the POS terminals is connectable to a mobile settlement system including one or more mobile terminals and a mobile settlement server configured to store data of commercial transactions performed using the mobile terminals. The one of the POS terminals is configured to acquire the data of the commercial transactions performed using the mobile terminals from the mobile settlement server, generate sales data from the acquired data, and transmit the generated sales data to the POS server.

17 Claims, 8 Drawing Sheets

| TRANSACTION NUMBER |
|---|
| TRANSACTION START DATE AND TIME |
| ELECTRONIC RECEIPT ID |
| MERCHANDISE SALES DATA (MERCHANDISE CODE, PRICE, NUMBER OF ITEMS, AMOUNT) |
| MERCHANDISE SALES DATA (MERCHANDISE CODE, PRICE, NUMBER OF ITEMS, AMOUNT) |
| ⋮ |
| MERCHANDISE SALES DATA (MERCHANDISE CODE, PRICE, NUMBER OF ITEMS, AMOUNT) |
| PAYMENT DATA (CATEGORY, AMOUNT OF PAYMENT) |
| SETTLEMENT COMPLETION FLAG Fa |
| INTEGRATION FLAG Fb |

Figure 3:
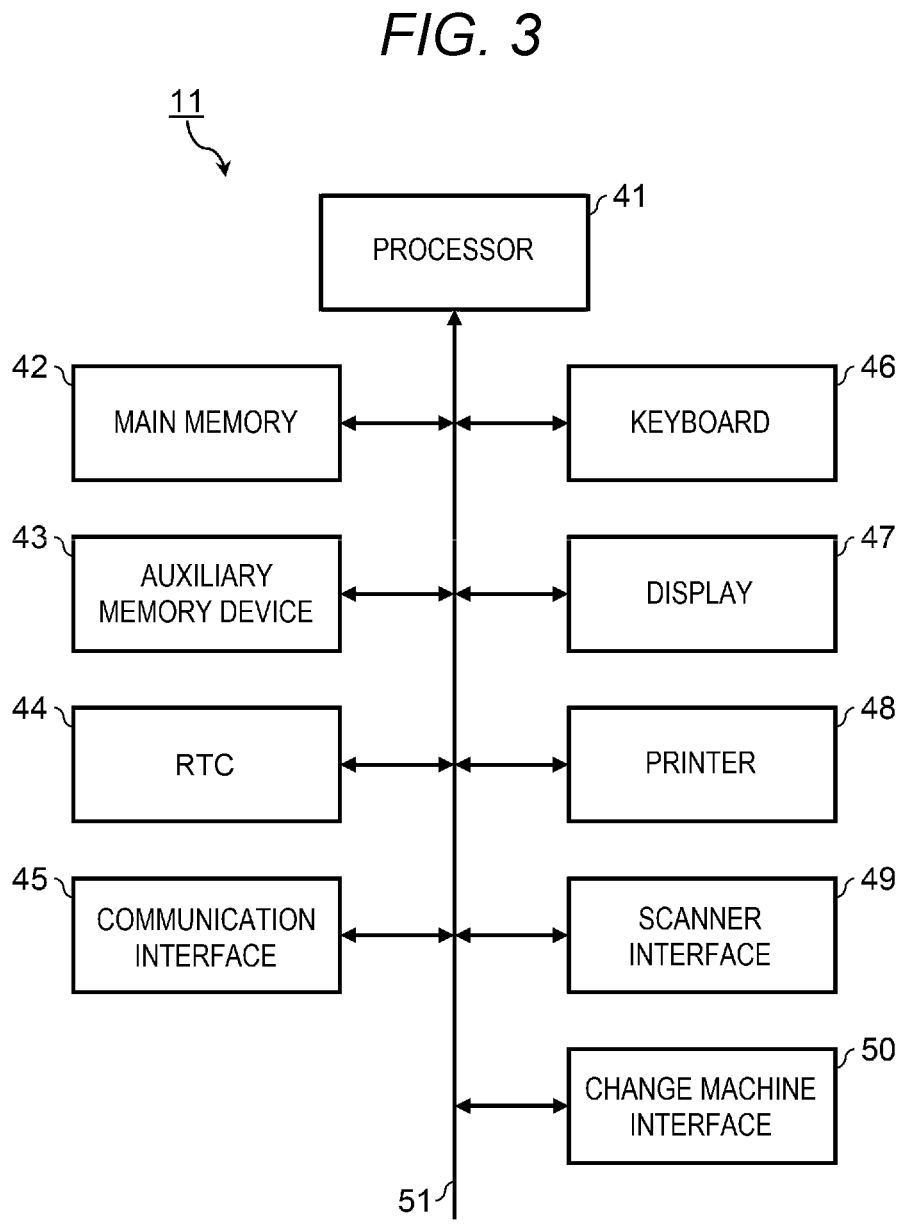

```
                              ┌─────────────────┐ ⌐41
                              │    PROCESSOR    │
                              └─────────────────┘
                                       ▲
                                       │
42⌐                                    │                    ⌐46
┌─────────────────┐                    │           ┌─────────────────┐
│  MAIN MEMORY    │◄──────►      ◄──────►           │    KEYBOARD     │
└─────────────────┘                    │           └─────────────────┘

43⌐                                    │                    ⌐47
┌─────────────────┐                    │           ┌─────────────────┐
│    AUXILIARY    │◄──────►      ◄──────►           │     DISPLAY     │
│  MEMORY DEVICE  │                    │           └─────────────────┘
└─────────────────┘

44⌐                                    │                    ⌐48
┌─────────────────┐                    │           ┌─────────────────┐
│      RTC        │◄──────►      ◄──────►           │     PRINTER     │
└─────────────────┘                    │           └─────────────────┘

45⌐                                    │                    ⌐49
┌─────────────────┐                    │           ┌─────────────────┐
│  COMMUNICATION  │◄──────►      ◄──────►           │     SCANNER     │
│    INTERFACE    │                    │           │    INTERFACE    │
└─────────────────┘                    │           └─────────────────┘
                                       │                    ⌐50
                                       │           ┌─────────────────┐
                                       │     ◄──────►           │ CHANGE MACHINE  │
                                       │           │    INTERFACE    │
                                   51⌐ │           └─────────────────┘
```

*FIG. 6*

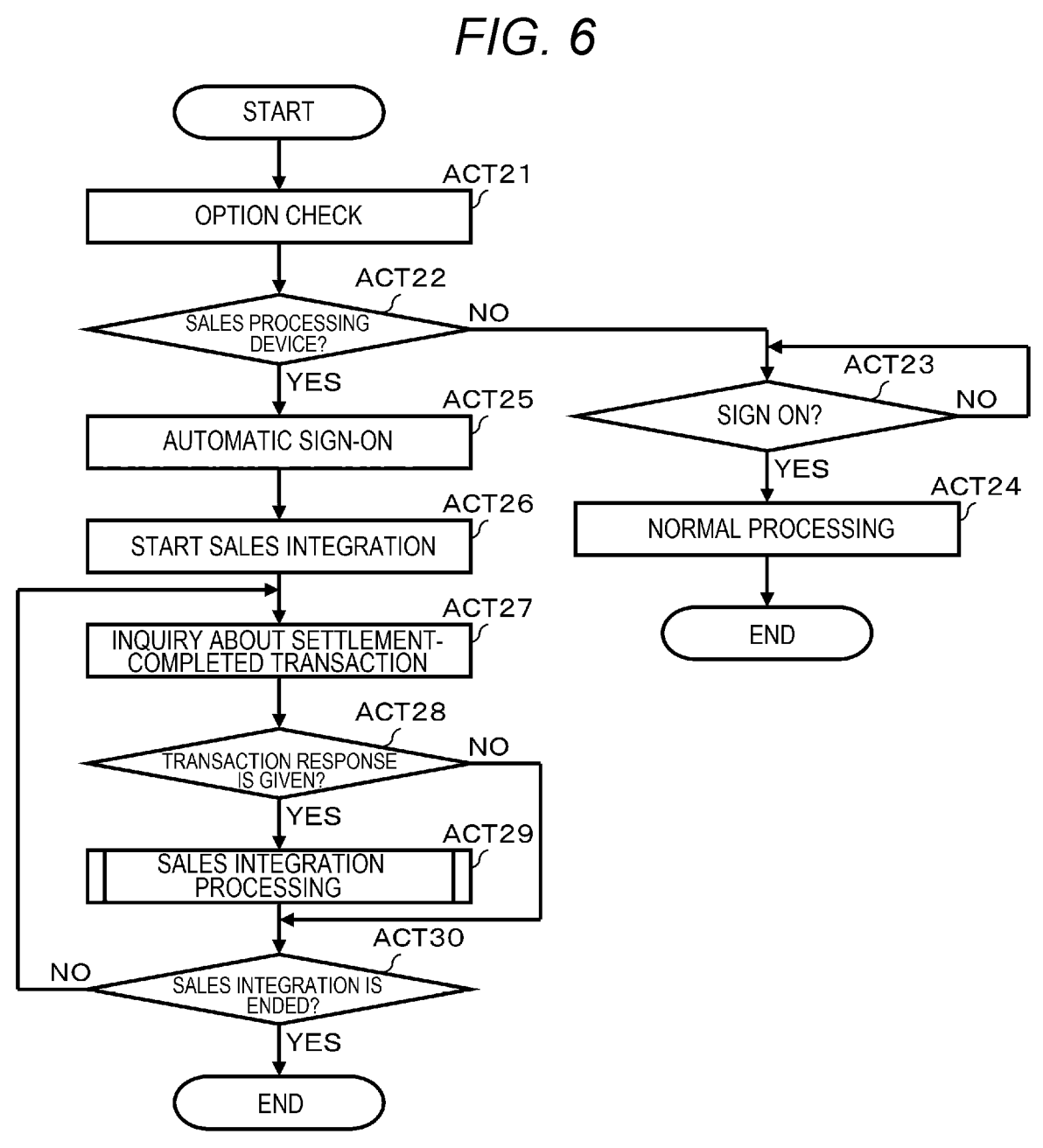

```
              ┌──────────────┐
              │    START     │
              └──────┬───────┘
                     │
                     ▼            ACT21
              ┌──────────────┐
              │ OPTION CHECK │
              └──────┬───────┘
                     │
                     ▼            ACT22
                  ╱────────╲              NO
              ╱ SALES PROCESSING ╲──────────────────────┐
               ╲    DEVICE?   ╱                          │
                  ╲────────╱                             │       ACT23
                     │                                   ▼  ┌──────────────┐
                    YES                              ╱────────╲        NO
                     ▼            ACT25          ╱   SIGN ON?   ╲──────────┤
              ┌──────────────────┐                  ╲────────╱            │
              │ AUTOMATIC SIGN-ON│                      │                 │
              └──────┬───────────┘                     YES                │
                     │                                  ▼      ACT24       │
                     ▼            ACT26          ┌──────────────────┐      │
              ┌──────────────────┐               │ NORMAL PROCESSING│      │
              │START SALES        │              └──────┬───────────┘      │
         ┌───▶│  INTEGRATION     │                      │                  │
         │    └──────┬───────────┘                      ▼                  │
         │           │                            ┌──────────┐            │
         │           ▼            ACT27            │   END    │            │
         │    ┌──────────────────┐                └──────────┘            │
         │    │INQUIRY ABOUT      │                                        │
         │    │SETTLEMENT-        │                                        │
         │    │COMPLETED          │                                        │
         │    │TRANSACTION        │                                        │
         │    └──────┬───────────┘                                        │
         │           │                                                    │
         │           ▼            ACT28                                   │
         │        ╱────────╲              NO                              │
         │    ╱ TRANSACTION RESPONSE╲──────────────┐                      │
         │     ╲  IS GIVEN?     ╱                   │                      │
         │        ╲────────╱                        │                      │
         │           │                              │                      │
         │          YES           ACT29             │                      │
         │    ┌──────────────────┐                  │                      │
         │  │ │ SALES INTEGRATION │ │               │                      │
         │  │ │   PROCESSING      │ │               │                      │
         │    └──────┬───────────┘                  │                      │
         │           │◄─────────────────────────────┘                      │
         │           ▼            ACT30                                    │
         │ NO     ╱────────╲                                              │
         └───────╱ SALES INTEGRATION IS ╲                                 │
                  ╲   ENDED?   ╱                                          │
                     ╲────────╱                                           │
                        │                                                 │
                       YES                                                │
                        ▼                                                 │
                 ┌──────────┐                                             │
                 │   END    │                                             │
                 └──────────┘                                             │
```

FIG. 7

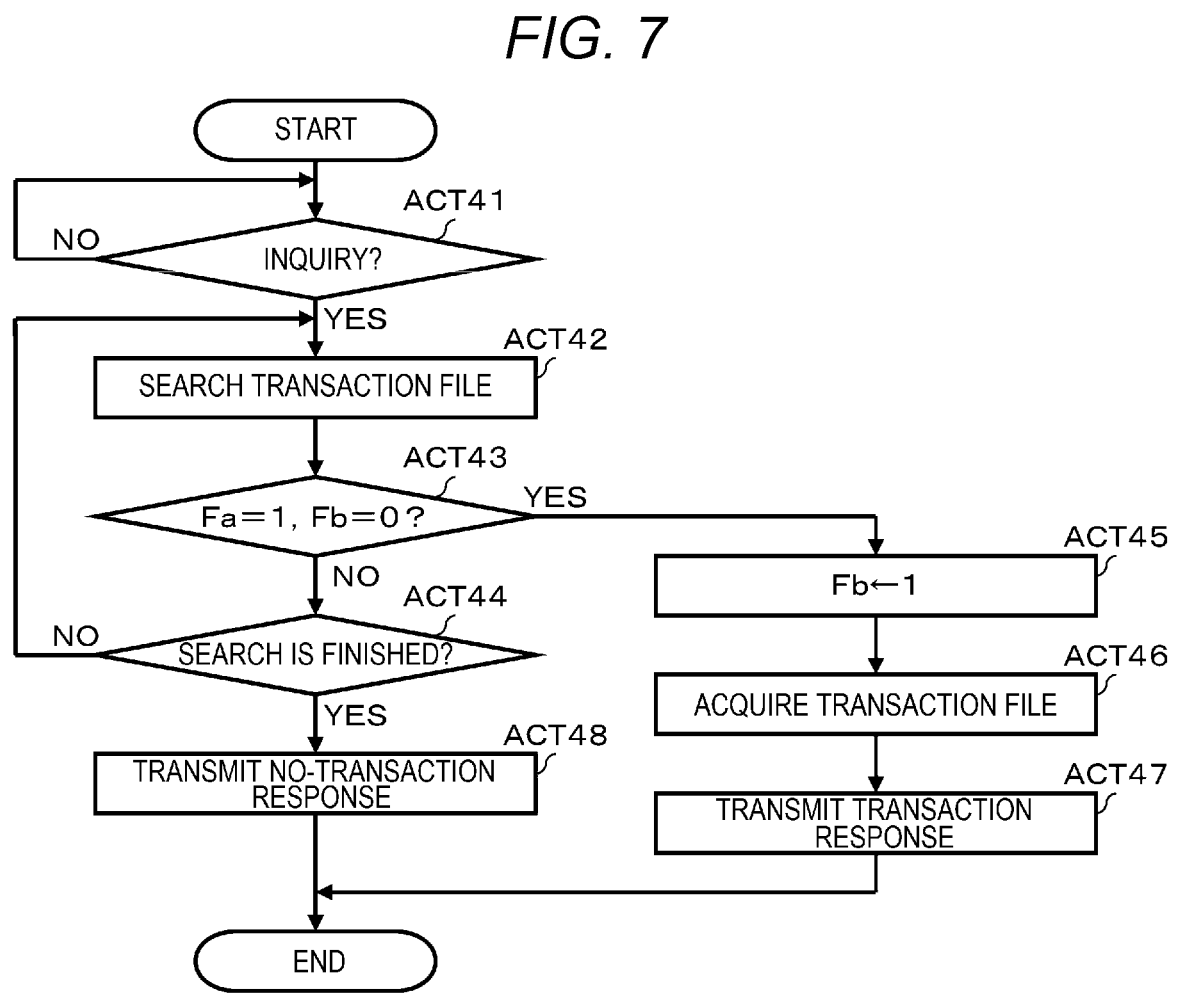

```
                    ( START )
                        │
        ┌───────────────┤
        │               ▼           ACT41
   NO   │        ◇─────────────◇
◀───────┤        │  INQUIRY?   │
        │        ◇─────────────◇
        │               │ YES
        │               ▼           ACT42
        │   ┌───────────────────────┐
        │   │ SEARCH TRANSACTION FILE│
        │   └───────────────────────┘
        │               │
        │               ▼           ACT43
        │        ◇─────────────◇  YES
        │        │ Fa=1, Fb=0? │────────────────────┐
        │        ◇─────────────◇                    │
        │               │ NO                         ▼              ACT45
        │               ▼           ACT44    ┌───────────────┐
   NO   │        ◇─────────────◇             │    Fb←1       │
◀───────┤        │SEARCH IS FINISHED?        └───────────────┘
        │        ◇─────────────◇                    │
                        │ YES                         ▼              ACT46
            ┌───────────────────────┐      ┌───────────────────────┐
            │ TRANSMIT NO-TRANSACTION│      │ ACQUIRE TRANSACTION FILE│
            │       RESPONSE         │      └───────────────────────┘
            └───────────────────────┘                │
                        │              ACT48          ▼              ACT47
                        │                    ┌───────────────────────┐
                        │                    │  TRANSMIT TRANSACTION │
                        │                    │       RESPONSE        │
                        │                    └───────────────────────┘
                        │                              │
                        ▼◀─────────────────────────────┘
                    ( END )
```

FIG. 8

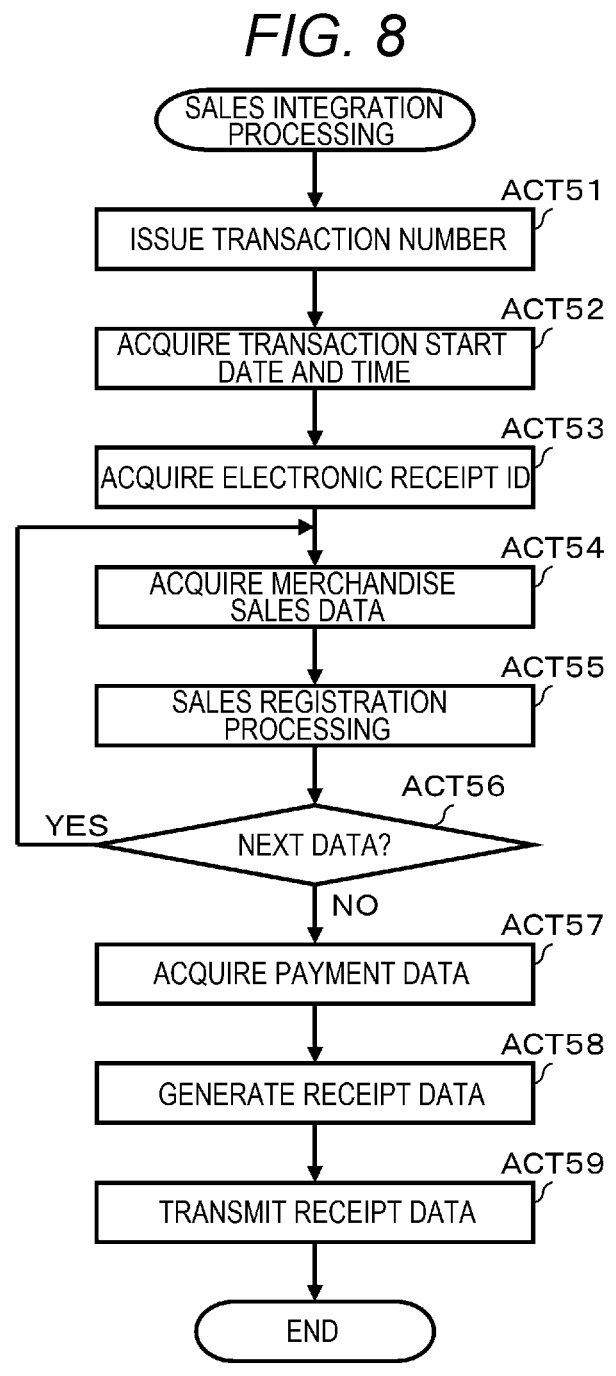

```
        ┌──────────────────────────┐
        │   SALES INTEGRATION      │
        │      PROCESSING          │
        └──────────────────────────┘
                     │
                     ▼                    ACT51
        ┌──────────────────────────┐
        │  ISSUE TRANSACTION NUMBER │
        └──────────────────────────┘
                     │
                     ▼                    ACT52
        ┌──────────────────────────┐
        │  ACQUIRE TRANSACTION START│
        │      DATE AND TIME        │
        └──────────────────────────┘
                     │
                     ▼                    ACT53
        ┌──────────────────────────┐
        │ ACQUIRE ELECTRONIC RECEIPT ID│
        └──────────────────────────┘
                     │
         ┌──────────▶│
         │           ▼                    ACT54
         │  ┌──────────────────────────┐
         │  │   ACQUIRE MERCHANDISE     │
         │  │      SALES DATA           │
         │  └──────────────────────────┘
         │           │
         │           ▼                    ACT55
         │  ┌──────────────────────────┐
         │  │   SALES REGISTRATION      │
         │  │      PROCESSING           │
         │  └──────────────────────────┘
         │           │
         │           ▼                    ACT56
         │ YES  ◇─────────────────◇
         └──────◇   NEXT DATA?    ◇
                 ◇─────────────────◇
                     │ NO
                     ▼                    ACT57
        ┌──────────────────────────┐
        │   ACQUIRE PAYMENT DATA    │
        └──────────────────────────┘
                     │
                     ▼                    ACT58
        ┌──────────────────────────┐
        │  GENERATE RECEIPT DATA    │
        └──────────────────────────┘
                     │
                     ▼                    ACT59
        ┌──────────────────────────┐
        │  TRANSMIT RECEIPT DATA    │
        └──────────────────────────┘
                     │
                     ▼
        ┌──────────────────────────┐
        │           END            │
        └──────────────────────────┘
```

POINT OF SALE SYSTEM, STORE SYSTEM, AND METHOD

CROSS-REFERENCE TO RELATED APPLICATION

This application is based upon and claims the benefit of priority from Japanese Patent Application No. 2023-048746, filed on Mar. 24, 2023, the entire contents of which are incorporated herein by reference.

FIELD

Embodiments described herein relate generally to a point of sale (POS) system, a store system, and a method.

BACKGROUND

Recently, a mobile settlement system permitting a purchaser himself or herself to operate a mobile terminal to complete registration and settlement processes on merchandise items to be purchased has been developed and has already been placed in practical service at a supermarket or the like. By introducing the mobile settlement system, a store can reduce congestion in its payment area or checkout lanes. The store can also reduce employees in charge of payment processes and therefore can reduce the cost of labor. However, some purchasers do not want to use such a mobile settlement system. Therefore, it is a common practice for the store to have both the mobile settlement system and a conventional POS system with a POS terminal, which is installed in the checkout lane.

In the conventional POS system, a POS server aggregates, in real time, sales data of a commercial transaction settled at the POS terminal. Therefore, there is an advantage in that the sales at the store can be understood or analyzed at any time. However, if the POS system and the mobile settlement system are used in parallel, there is no way for the POS server of the POS system to aggregate sales data of the commercial transactions settled by the mobile settlement system. Complex work must therefore be done for the store to integrate the sales data of the commercial transactions settled by the mobile settlement system with the sales data aggregated by the POS server to permit understanding or analysis of all the sales at the store.

BRIEF DESCRIPTION OF THE DRAWINGS

FIG. 2 is a schematic view showing a main data structure of a transaction file.

FIG. 3 is a block diagram showing a hardware configuration of a POS terminal.

FIG. 6 is a flowchart of information processing executed by the POS terminal.

FIG. 7 is a flowchart of information processing executed by the mobile settlement server in conjunction with the POS terminal functioning as a sales processing device.

FIG. 8 is a flowchart of sales integration processing shown in FIG. 6.

DETAILED DESCRIPTION

Embodiments described herein provide a POS system, a store system, and a method that can integrate sales data of a commercial transaction settled by a mobile settlement system into sales data aggregated by a POS server in an improved manner.

In general, according to one embodiment, a POS system includes a POS server configured to manage sales data of a store, and a plurality of POS terminals installed in the store and configured to perform processing for commercial transactions at the store and transmit data of the commercial transactions to the POS server. One of the POS terminals is connectable to a mobile settlement system including one or more mobile terminals and a mobile settlement server configured to store data of commercial transactions performed using the mobile terminals. The one of the POS terminals is configured to acquire the data of the commercial transactions performed using the mobile terminals from the mobile settlement server, generate sales data from the acquired data, and transmit the generated sales data to the POS server.

Embodiments will now be described with reference to the drawings. In one embodiment, a store such as a supermarket uses a POS system 10 and a mobile settlement system 20 in parallel, and one of a plurality of POS terminals 11 functions as a sales processing device to integrate sales data of a commercial transaction settled by the mobile settlement system 20 into sales data aggregated by a POS server 12 of the POS system 10.

Description of Store System

Figure 1:
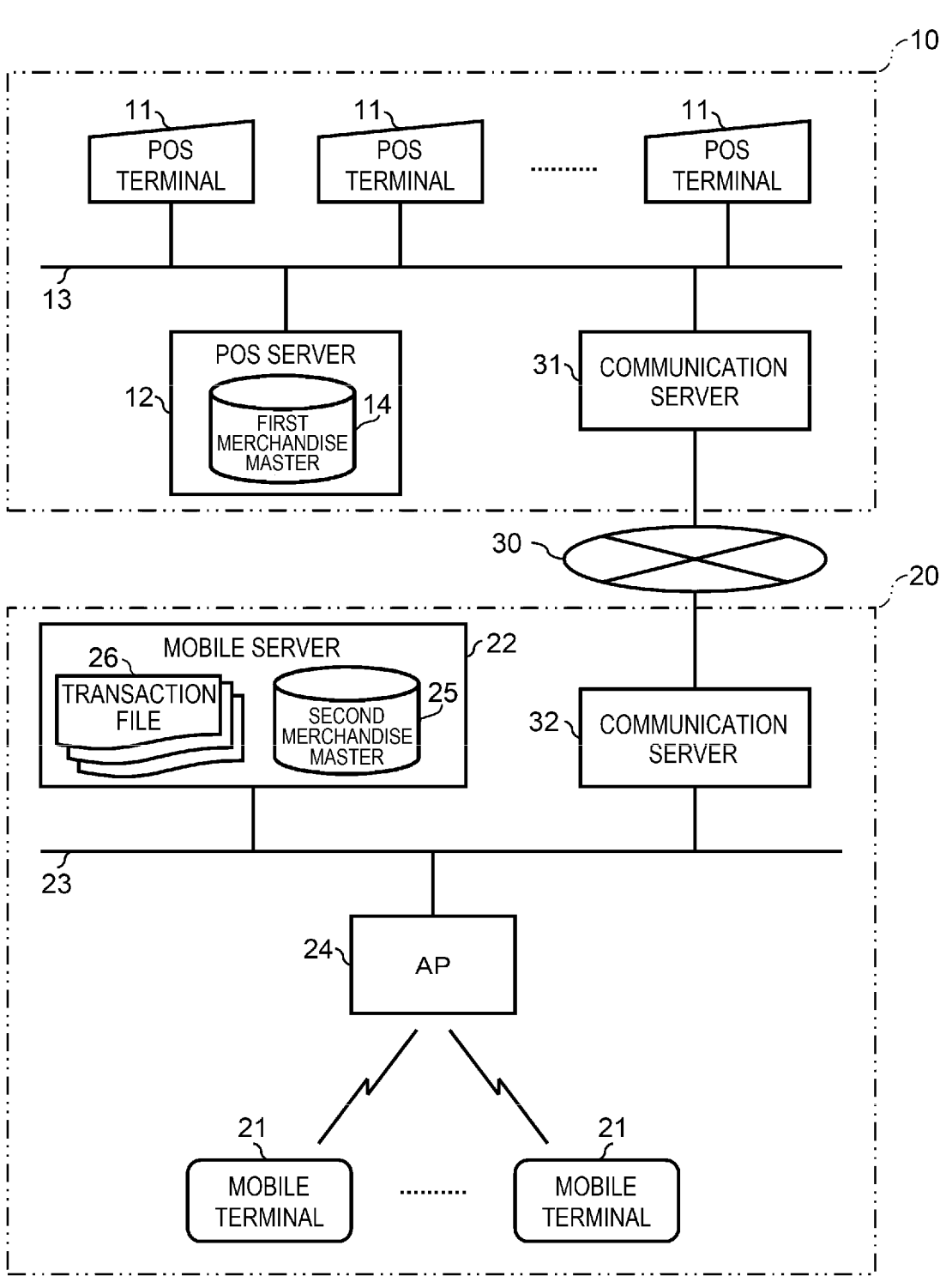
FIG. 1 is a schematic view showing a configuration of a store system in an embodiment.

FIG. 1 is a schematic view showing a configuration of a store system 1 installed at a store according to an embodiment. The store system 1 includes the POS system 10 and the mobile settlement system 20.

The POS system 10 further includes the POS terminals 11 and the POS server 12. In the POS system 10, the POS terminals 11 and the POS server 12 are connected to each other via a communication network 13. The communication network 13 is, for example, a LAN (local area network).

The POS terminal 11 is a device for performing registration of a merchandise item to be purchased and settlement of a commercial transaction on the registered merchandised item. The POS terminal 11 may be a conventional type where an employee performs registration of a merchandise item and settlement of the commercial transaction, or may be a self-service type where a customer performs registration of a merchandise item to be purchased and settlement of the commercial transaction. Alternatively, the POS terminal 11 may be a distributed or semi-self-service type where an employee performs registration of a merchandise item to be purchased and a customer performs settlement of a commercial transaction.

In the POS system 10, the POS server 12 gathers and aggregates sales data of merchandise items to be purchased registered in commercial transactions settled by each POS terminal 11, via the communication network 13, and thus manages information such as the sales and stock at the store as of when each merchandise item is sold.

The POS server 12 has a first merchandise master database 14 (hereinafter simply referred to as the first merchandise master. The first merchandise master 14 is an aggregate of merchandise records generated on a per merchandise item basis that is put on sale at the store. The merchandise record is a data record describing merchandise data such as a merchandise code, a merchandise name, and a price. The merchandise code is a univocal code set on a per merchandise item basis to identify each merchandise item. The merchandise name and the price are the name of the merchandise item identified by the merchandise code in the same record, and the price per item. The first merchandise master 14 is an example of a price file that sets the price of each merchandise item.

The POS terminal 11 accepts an input of a merchandise code. For example, to each merchandise item, a barcode representing the merchandise code unique to the merchandise item is attached, and the POS terminal 11 has a scanner to scan the barcode. When a merchandise code is inputted via the input unit, the POS terminal 11 inquires of the POS server 12 about the price of the merchandise item identified by the merchandise code. The POS server 12 having received the inquiry detects a merchandise record including the inputted merchandise code from the first merchandise master 14 and sends a response including the merchandise data such as the merchandise name and the price in the merchandise record to the POS terminal 11 having sent the inquiry. The POS terminal 11 processes the sales data of the merchandise item, based on the price or the like of the merchandise data included in the response from the POS server 12.

The mobile settlement system 20 includes a plurality of mobile terminals 21 and a mobile settlement server 22 (hereinafter simply referred to as the mobile server 22). In the mobile settlement system 20, the mobile terminals 21 and the mobile server 22 are connected to each other wirelessly via an access point 24 on a communication network 23.

The mobile terminal 21 is a portable information terminal having an input and output device such as a touch panel and a camera, and a wireless communication interface configured to be able to wirelessly communicate with the access point 24. For example, a smartphone owned by a purchaser, a handheld terminal lent by the store, a tablet terminal attached to a shopping cart, or the like, can be the mobile terminal 21.

An operator of the mobile terminal 21 is a purchaser who shops merchandise items to be purchased at the store. Every time the purchaser takes up a merchandise item to be purchased, the purchaser operates the mobile terminal 21 to input data about the merchandise item to be purchased. For example, the purchaser causes the camera of the mobile terminal 21 to scan the barcode on the merchandise item to be purchased and thus inputs the merchandise code of the merchandise item to be purchased. For example, the purchaser operates the touch panel of the mobile terminal 21 and thus inputs the merchandise code, the number of items to be purchased, and the like, of the merchandise item to be purchased. The data about the merchandise item to be purchased inputted to the mobile terminal 21 is wirelessly transmitted to and received by the mobile server 22 via the access point 24.

The purchaser having finished the shopping performs an operation to make payment on the mobile terminal 21. As the purchaser performs such an operation, a payment method for the payment becomes selectable on the mobile terminal 21. Therefore, the purchaser selects a desired payment method and performs an operation to pay the price by the payment method to the mobile terminal 21. As the purchaser performs the operation to pay the price, payment data is wirelessly transmitted from the mobile terminal 21 and received by the mobile server 22 via the access point 24.

The mobile server 22 has a second merchandise master database 25 (hereinafter simply referred to as the second merchandise master 25). The second merchandise master 25 is an aggregate of merchandise records generated on a per merchandise item basis that is put on sale at the store, similarly to the first merchandise master 14. The merchandise records saved in the second merchandise master 25 basically coincide with the merchandise records saved in the first merchandise master 14.

The mobile server 22 has a memory to save a plurality of transaction files 26. The transaction file 26 is a data file generated on a per purchaser basis who performs registration of a merchandise item to be purchased and settlement of the commercial transaction, using the mobile terminal 21.

FIG. 2 is a schematic view showing a data structure of the transaction file 26. As illustrated, a transaction number, a transaction start date and time, an electronic receipt ID, one or more pieces of merchandise sales data, payment data, a settlement completion flag Fa, an integration flag Fb, and the like, are described in the transaction file 26. The transaction number is a unique number issued to identify a commercial transaction settled by the mobile terminal 21. The transaction start date and time is the date and time when the commercial transaction is started.

The electronic receipt ID is identification information assigned to a user of an electronic receipt service. An electronic receipt is a receipt issued by the electronic receipt service and in which details of a commercial transaction are recorded. The data on the electronic receipt is saved in an electronic receipt server in correlation with the electronic receipt ID. The user of the electronic receipt accesses the electronic receipt server using his or her smartphone or the like, and downloads the receipt data correlated with the user's own electronic receipt ID, and thus can view the electronic receipt. It is difficult to dispense a paper receipt to a purchaser who performs registration of a merchandise item to be purchased and settlement of a commercial transaction, using the mobile terminal 21. Therefore, the purchaser using the mobile terminal 21 may be preferably a user of the electronic receipt service.

The merchandise sales data is formed of data such as the merchandise code, the price, the number of items to be purchased, and the amount of sales, of a merchandise item to be purchased. The merchandise code is an identification code of the merchandise item to be purchased that is inputted to the mobile terminal 21. The price is the price set in the merchandise record including the inputted merchandise code, of the merchandise records stored in the second merchandise master 25. The number of items to be purchased is the number of items to be purchased that is inputted to the mobile terminal 21 if this number of items is inputted to the mobile terminal 21, and "1" if the number of items to be purchased is not inputted. The amount of sales is the amount calculated by multiplying the price by the number of items to be purchased.

The payment data includes a payment type to identify a payment method for the price, and the amount of payment by the payment method. In a commercial transaction settled by the mobile terminal 21, it is difficult to make the payment by cash because the purchaser does not go through the payment area or checkout lane. Therefore, the payment method for the price is limited to a cashless settlement such as a settlement by credit card, a settlement by electronic money, or code settlement.

The settlement completion flag Fa is 1-bit data to identify whether the settlement of the commercial transaction managed in the transaction file 26 is complete. In an embodiment, the settlement completion flag Fa is "0" when indicating that the settlement is not complete, and "1" when indicating that the settlement is complete.

The integration flag Fb is 1-bit data to identify whether the sales data of the commercial transaction managed in the transaction file 26 is already integrated with the sales data aggregated in the POS system 10. In an embodiment, the integration flag Fb is "0" when indicating that the sales data is not integrated yet, and "1" when indicting that the sales data is already integrated.

The description continues, referring back to FIG. 1.

In the POS system 10, a communication server 31 is connected to the communication network 13. In the mobile settlement system 20, a communication server 32 is connected to the communication network 23. Both of the communication server 31 and the communication server 32 are configured to provide a data communication service via an inter-server network 30. Such connection enables the POS server 12 in the POS system 10 and the mobile server 22 in the mobile settlement system 20 to transmit and receive data to and from each other. Although not illustrated, the foregoing electronic receipt server is connected to the inter-server network 30. Such connection enables the POS server 12 to transmit receipt data to the electronic receipt server via the inter-server network 30.

Description of Configuration of POS Terminal

FIG. 3 is a block diagram showing a hardware configuration of the POS terminal 11. The POS terminal 11 has a processor 41, a main memory 42, an auxiliary memory device 43, a real-time clock (RTC) 44, a communication interface 45, a keyboard 46, a display 47, a printer 48, a scanner interface 49, a change machine interface 50, and a system transmission path 51 or the like. The system transmission path 51 includes an address bus, a data bus, a control signal line or the like. The system transmission path 51 connects the processor 41 to the other components and transmits a data signal transmitted and received between the processor 41 and the other components.

In the POS terminal 11, the processor 41, the main memory 42, the auxiliary memory device 43, the RTC 44, and the communication interface 45 are connected to each other by the system transmission path 51 and thus form a computer. Also, an input and output device such as the keyboard 46, the display 47, and the printer 48, and a device interface such as the scanner interface 49 and the change machine interface 50 are connected to the system transmission path 51 to perform the functions of the POS terminal 11. The input and output device or the device interface coupled to the system transmission path 51 is not limited to the foregoing example. For example, another input and output device such as a card reader or a pointing device may be connected. An interface of a cashless settlement terminal or the like may be connected.

The processor 41 is a core component of the POS terminal 11. The processor 41 controls each part in order to perform various functions of the POS terminal 11 according to an operating system and an application program(s). The processor 41 is, for example, a CPU (central processing unit). The processor 41 may preferably be a multicore processor including a plurality of processor cores and configured to be able to execute a plurality of processes in parallel.

The main memory 42 includes a non-volatile memory area and a volatile memory area. The main memory 42 stores an operating system and an application program(s) in the non-volatile memory area. In some cases, the non-volatile or volatile memory area of the main memory 42 may store necessary data for the processor 41 to execute processing to control each part. In the main memory 42, the volatile memory area is used as a work area where the processor 41 rewrites data. The non-volatile memory area is, for example, a ROM (read-only memory). The volatile memory area is, for example, a RAM (random-access memory).

The auxiliary memory device 43 is, for example, an EEPROM® (electrically erasable programmable read-only memory), an HDD (hard disk drive), or an SSD (solid-state drive) or the like. The auxiliary memory device 43 stores data used by the processor 41 to perform various processing or data generated as a result of processing by the processor 41, or the like. In some cases, the auxiliary memory device 43 may store the foregoing application program(s).

The RTC 44 tracks the date and time. The processor 41 processes the date and time tracked by the RTC 44, as the current date and time.

The communication interface 45 is an interface circuit to perform data communication with the POS server 12 connected to the communication network 13.

Figure 4:
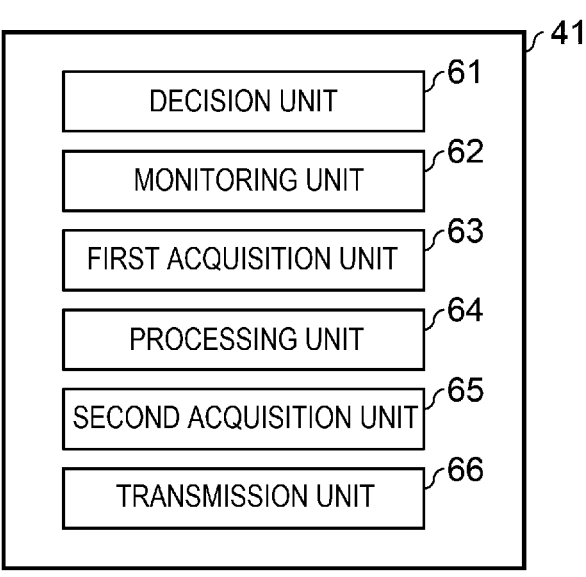
FIG. 4 is a schematic view showing a functional configuration of the POS terminal.

In the POS terminal 11 of such a configuration, the processor 41 performs the functions of: a decision unit 61, a monitoring unit 62, a first acquisition unit 63, a processing unit 64, a second acquisition unit 65, and a transmission unit 66, as shown in FIG. 4.

The decision unit 61 has a function of deciding whether the POS terminal 11 functions as a sales processing device when the power is turned on. The POS terminal 11 stores a sales processing flag as an option flag. The sales processing flag is 1-bit data to identify whether the POS terminal 11 functions as the sales processing device, and is set to "1" or "0". In an embodiment, the sales processing flag is "1" when indicating that the POS terminal 11 functions as the sales processing device, and "0" when indicating that the POS terminal 11 does not function as the sales processing device. The decision unit 61 checks the sales processing flag and decides that the POS terminal 11 functions as the sales processing device if the sales processing flag is set to "1".

In an embodiment, the sales processing flag of any one POS terminal 11, of the plurality of POS terminals 11, is set to "1" and this POS terminal 11 is made to function as the sales processing device. The POS terminal 11 functioning as the sales processing device is installed, for example, in a back office of the store. The sales processing flag of the other POS terminals 11 is set to "0". The POS terminal 11 with the sales processing flag of "0" is installed in the payment area or checkout lane of the store.

The functions of the monitoring unit 62, the first acquisition unit 63, the processing unit 64, the second acquisition unit 65, and the transmission unit 66 are performed by the processor 41 of the POS terminal 11 functioning as the sales processing device. The monitoring unit 62 has a function of monitoring the settlement of a commercial transaction in the mobile settlement system 20. The first acquisition unit 63 has a function of acquiring data about a merchandise item sold and purchased in the commercial transaction settled by the mobile settlement system 20. The data about the merchandise item includes the merchandise code and the price. The processing unit 64 has a function of processing the sales data of the commercial transaction settled by the mobile settlement system 20, based on the data about the merchandise item acquired by the first acquisition unit 63. The processing unit 64 performs processing to integrate the sales data of the commercial transaction settled by the mobile settlement system 20 into the sales data aggregated by the POS server of the POS system 10. The second acquisition unit 65 has a function of acquiring the user identification information that identifies the user of the electronic receipt, that is, the electronic receipt ID, from the data of the commercial transaction inputted via the mobile terminal 21. The transmission unit 66 has a function of transmitting electronic data of a receipt showing details of the commercial transaction having the sales data processed by the processing unit 64, along with the user identification information acquired by the second acquisition unit 65, to the electronic receipt server.

The functions of the decision unit 61, the monitoring unit 62, the first acquisition unit 63, the processing unit 64, the second acquisition unit 65, and the transmission unit 66 are performed by the processor 41 according to an operation program(s). The operation program is a kind of an application program stored in the main memory 42 or the auxiliary memory device 43. The installation of the operation program in the main memory 42 or the auxiliary memory device 43 is not limited to any particular method. The operation program can be recorded in a removable recording medium or distributed by communication via a network and thus can be installed in the main memory 42 or the auxiliary memory device 43. The recording medium may be in any form that can store a program and is readable by a device, such as a CD-ROM or a memory card.

Description of Operation of Store System

Figure 5:
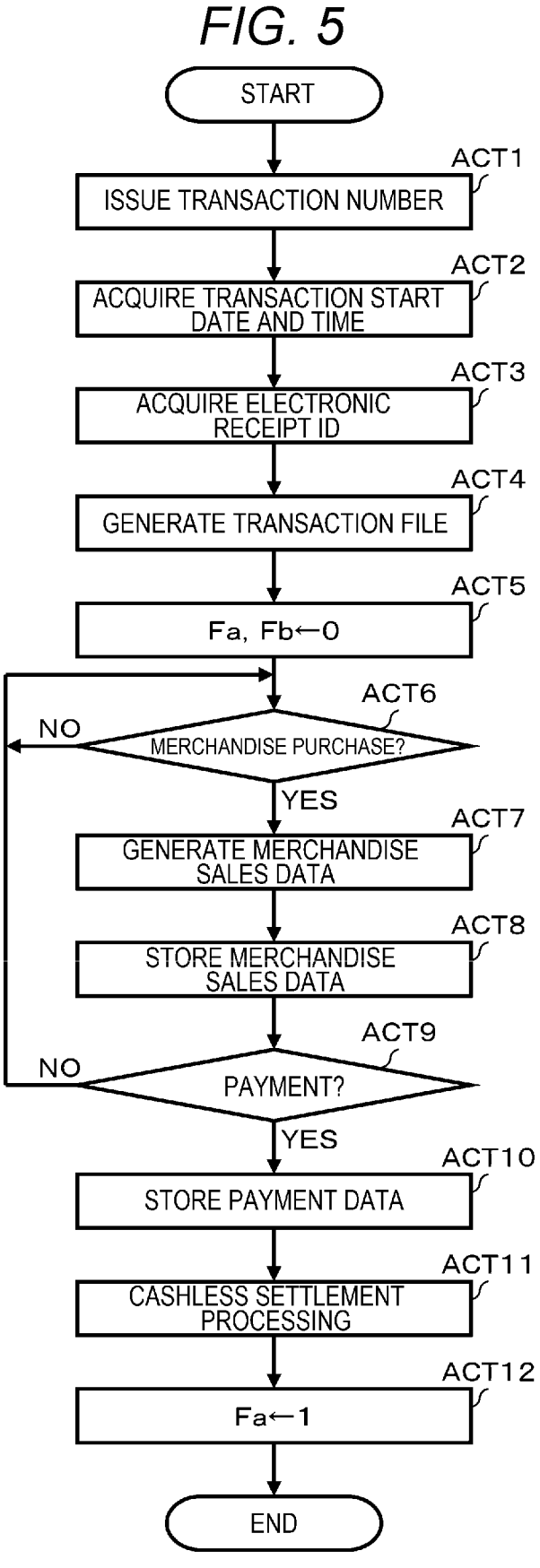
FIG. 5 is a flowchart of information processing executed by a mobile settlement server in conjunction with a mobile terminal.

FIG. 5 is a flowchart of information processing executed by the mobile server 22 in conjunction with the mobile terminal 21 when a purchaser performs registration of a merchandise item to be purchased and settlement of a commercial transaction, using a mobile terminal 21. FIG. 6 is a flowchart of information processing executed by the processor 41 of the POS terminal 11. FIG. 7 is a flowchart of information processing executed by the mobile server 22 in conjunction with the POS terminal 11 functioning as a sales processing device. FIG. 8 is a flowchart of sales integration processing in FIG. 6. Main operations of the POS system 10 and the mobile settlement system 20 will now be described, based on the information processing described with reference to those flowcharts. The operations described below are mere examples. The information processing corresponding to each operations is not particularly limited, provided that similar effects can be achieved.

First, the purchaser performing registration of a merchandise item to be purchased and settlement of a commercial transaction, operating the mobile terminal 21, performs an operation to give a command to start shopping to the mobile terminal 21. For example, the purchaser touches a start button on a startup screen displayed on the touch panel of the mobile terminal 21. In response to such an operation, a startup command is sent out from the mobile terminal 21. The startup command is transmitted to the mobile server 22 via the access point 24.

The mobile server 22 having received the startup command starts the information processing shown in the flowchart of FIG. 5. In ACT 1, the mobile server 22 issues a new transaction number. For example, the mobile server 22 has a transaction number counter and increases the count value of the counter every time the startup command is received. The mobile server 22 acquires the increased count value of the counter as the transaction number.

In ACT 2, the mobile server 22 acquires a transaction start date and time. For example, the mobile server 22 acquires the current date and time tracked by a built-in RTC, as the transaction date and time.

In ACT 3, the mobile server 22 acquires an electronic receipt ID. For example, if the mobile terminal 21 is a handheld terminal loaned by the store or a tablet terminal attached to a shopping cart, the operator causes the camera of the mobile terminal 21 to read a barcode representing an electronic receipt ID displayed on the operator's own smartphone. Thus, data of the electronic receipt ID is sent out from the mobile terminal 21. Meanwhile, if the mobile terminal 21 is the operator's own smartphone and an electronic receipt ID is registered therein, data of this electronic receipt ID is sent out from the mobile terminal 21. The data of the electronic receipt ID sent out from the mobile terminal 21 is transmitted to the mobile server 22 via the access point 24. The mobile server 22 acquires the electronic receipt ID from the received data.

After finishing the processing of ACTS 1 to 3, the mobile server 22 proceeds to ACT 4. In ACT 4, the mobile server 22 generates a transaction file 26. That is, the mobile server 22 generates the transaction file 26 describing the transaction number acquired in the processing of ACT 1, the transaction start date and time acquired in the processing of ACT 2, and the electronic receipt ID acquired in the processing of ACT 3.

The mobile server 22 having generated the transaction file 26 proceeds to ACT 5. In ACT 5, the mobile server 22 sets both the settlement completion flag Fa and the integration flag Fb in the transaction file 26 to "0".

After finishing the processing of ACTS 1 to 5, the mobile server 22 proceeds to ACT 6. In ACT 6, the mobile server 22 waits to receive a merchandise purchase command from the mobile terminal 21. The merchandise purchase command is a command sent out from the mobile terminal 21 in response to the input of data about a merchandise item to be purchased with the mobile terminal 21. The merchandise purchase command includes data about the merchandise item to be purchased, that is, the merchandise code, the number of items to be purchased, and the like.

After receiving the merchandise purchase command, the mobile server 22 proceeds to ACT 7. In ACT 7, the mobile server 22 generates merchandise sales data. That is, the mobile server 22 searches the second merchandise master 25 by the merchandise code included in the merchandise purchase command and acquires the price in the merchandise record including this merchandise code. The mobile server 22 then generates merchandise sales data including the merchandise code, the price, the number of items to be purchased, and the amount of purchase.

The mobile server 22 having generated the merchandise sales data proceeds to ACT 8. In ACT 8, the mobile server 22 describes the merchandise sales data into the transaction file 26 generated in the processing of ACT 4. Subsequently, in ACT 9, the mobile server 22 checks whether a payment command is received. The payment command is a command sent out from the mobile terminal 21 in response to the input of payment data at the mobile terminal 21. The payment command includes the payment type and the amount of payment, which are the payment data.

If a payment command is not received, the mobile server 22 returns to ACT 6. That is, the mobile server 22 waits for a merchandise purchase command. On receiving a merchandise purchase command, the mobile server 22 executes the processing of ACTS 7 and 8 similarly to the above. In this way, the mobile server 22 repeatedly executes the processing of ACTS 7 and 8 every time the mobile server 22 receives a merchandise purchase command from the mobile terminal 21. Consequently, merchandise sales data is described in the transaction file 26 on a per merchandise item basis that is registered at the mobile terminal 21.

After receiving the payment command, the mobile server 22 proceeds to ACT 10. In ACT 10, the mobile server 22 describes the payment data included in the payment command into the transaction file 26. In ACT 11, the mobile server 22 executes cashless settlement processing. For example, if the payment type of the payment data indicates payment by credit card, a credit transaction with a credit card is performed. For example, if the payment type of the payment data indicates payment by electronic money, the amount of payment is subtracted from the balance of the purchaser's electronic money account. For example, if the payment type of the payment data indicates code settlement, the amount of payment is subtracted from an amount available for payment specified by a code. Such cashless settlement processing is known processing and therefore will not be described further in detail.

The mobile server 22 having finished the cashless settlement processing proceeds to ACT 12. In ACT 12, the mobile server 22 switches the settlement completion flag Fa in the transaction file 26 to "1".

Then, the mobile server 22 ends the information processing that is executed when a startup command is received from the mobile terminal 21. If a startup command is received from another mobile terminal 21, the mobile server 22 also executes the processing of ACTS 1 to 12 similarly to the above. If, before information processing corresponding to one mobile terminal 21 ends, a startup command is received from another mobile terminal 21, the mobile server 22 executes the processing of ACTS 1 to 12 in parallel.

The processor 41 of each POS terminal 11 starts the information processing shown in the flowchart of FIG. 6, when the power is turned on and the POS terminal 11 is activated. First, in ACT 21, the processor 41 performs an option check. The option check is the processing of checking an option flag that is set in the auxiliary memory device 43. The option flag includes the foregoing sales processing flag. In ACT 22, the processor 41 checks whether the sales processing flag is "1".

If the sales processing flag is not "1", the corresponding POS terminal 11 is set not to function as a sales processing device. In this case, the processor 41 proceeds to ACT 23. In ACT 23, the processor 41 waits for the operator to make a sign-on. If a sign-on is made, the processor 41 proceeds to ACT 24. In ACT 24, the processor 41 executes processing as a regular POS terminal 11.

Meanwhile, if the sales processing flag is "1", the corresponding POS terminal 11 is set to function as a sales processing device. In this case, the processor 41 proceeds to ACT 25. In ACT 25, the processor 41 executes an automatic sign-on. For example, the processor 41 assumes that a sign-on code that is prepared in advance is inputted, and therefore proceeds to ACT 26. In ACT 26, the processor 41 starts a sales integration mode.

The processor 41 having started the sales integration mode proceeds to ACT 27. In ACT 27, the processor 41 controls the communication interface 45 to transmit an inquiry command about a settlement-completed transaction. This control causes an inquiry command about a settlement-completed transaction to be transmitted from the communication interface 45. The inquiry command about a settlement-completed transaction is transmitted from the communication server 31 to the communication server 32 via the inter-server network 30 and is further transmitted to the mobile server 22.

The mobile server 22 having received the inquiry command about a settlement-completed transaction executes the information processing shown in the flowchart of FIG. 7, as will be described in detail later. Consequently, a transaction response or a no-transaction response is sent back from the mobile server 22 to the POS terminal 11 having sent the inquiry.

If a transaction response is received, the processor 41 proceeds to ACT 29. The processor 41 executes sales integration processing. Meanwhile, if a no-transaction response is received, the processor 41 does not execute the sales integration processing. The sales integration processing will be described later, using FIG. 8.

After executing the sales integration processing in response to the transaction response or after receiving the no-transaction response, the processor 41 proceeds to ACT 30. In ACT 30, the processor 41 checks whether the sales integration mode is ended. The sales integration mode ends, for example, when a predetermined time has come after the closing time.

If the sales integration mode is not ended, the processor 41 returns to ACT 27. The processor 41 then executes the processing of ACTS 27 to 30 similarly to the above. In this way, the processor 41 repeatedly executes the processing of ACTS 27 to 30 during the period from the start to the end of the sales integration mode. That is, the processor 41 periodically controls the communication interface to transmit the inquiry command about settlement completion, and executes the sales integration processing only if the transaction response is received. The interval of this periodical transmission varies depending on the speed of information processing but may preferably be every few seconds or every few tens of seconds.

By the processing of ACT 22, the processor 41 performs the function of the decision unit 61. Also, by the processing of ACT 27, the processor 41 performs the function of the monitoring unit 62.

As shown in FIG. 7, in ACT 41, the mobile server 22 waits for an inquiry command about a settlement-completed transaction. On receiving the inquiry command, the mobile server 22 proceeds to ACT 42. In ACT 42, the mobile server 22 searches the transaction files 26, for example, in descending order of transaction number, and checks the settlement completion flag Fa and the integration flag Fb.

The transaction file 26 where the settlement completion flag Fa is "O" is of a commercial transaction for which the settlement is not completed yet. The transaction file 26 where the settlement completion flag Fa is "1" is of a commercial transaction for which the settlement is complete by the operation of the mobile terminal 21. The transaction file 26 where the integration flag Fb is "0" is a file on which the sales integration processing is not finished yet. The transaction file 26 where integration flag Fb is "1" is a file on which the sales integration processing is already finished.

In ACT 43, the mobile server 22 checks whether the settlement completion flag Fa is "1" and the integration flag Fb is "0" in the transaction file 26. If so, the mobile server 22 proceeds to ACT 44. In ACT 44, the mobile server 22 checks whether the search of the transaction files 26 is finished. If the search of the transaction files 26 is not finished, the mobile server 22 returns to ACT 42. The mobile server 22 searches the next transaction file 26 and checks the settlement completion flag Fa and the integration flag Fb.

If the transaction file 26 where the settlement completion flag Fa is "1" and the integration flag Fb is "0" is detected, the mobile server 22 proceeds to ACT 45. In ACT 45, the mobile server 22 rewrites the integration flag Fb in this transaction file 26 with "1". Next, in ACT 46, the mobile server 22 acquires this transaction file 26. In ACT 47, the mobile server 22 transmits a transaction response. The transaction response includes the data of the transaction file 26 acquired in the processing of ACT 46. The transaction response is received by the POS terminal 11 having transmitted the inquiry command, that is, the POS terminal 11 functioning as the sales processing device.

If the search of the transaction files 26 is finished without detecting the transaction file 26 where the settlement completion flag Fa is "1" and the integration flag Fb is "0", the mobile server 22 proceeds to ACT 48. In ACT 48, the mobile server 22 transmits a no-transmission response. The no-transmission response, too, is received by the POS terminal 11 having transmitted the inquiry command, that is, the POS terminal 11 functioning as the sales processing device.

After transmitting the no-transmission response or the transmission response, the mobile server 22 ends the information processing according to the procedures shown in FIG. 7.

In this way, the mobile server 22 repeatedly executes the processing of ACTS 42 to 48 every time an inquiry command about a settlement-completed transaction is received. Consequently, if the transaction file 26 where the settlement completion flag Fa is "1" and the integration flag Fb is "0" is generated, a transaction response including data of this transaction file 26 is transmitted from the mobile server 22 to the POS terminal 11 functioning as the sales processing device. The processor 41 of the POS terminal 11 having received the transaction response executes the sales integration processing as described above. Specific procedures of the sales integration processing will now be described, using FIG. 8.

As shown in FIG. 8, as the processor 41 starts the sales integration processing, the processor 41 issues a transaction number in ACT 51. For example, the POS terminal 11 has a transaction number counter and increases the count value of the counter every time the processor 41 enters the sales integration processing. The processor 41 acquires the increased count value of the counter as the transaction number. Next, in ACT 52, the processor 41 acquires a transaction start date and time from the transaction file 26 included in the transaction response. In ACT 53, the processor 41 acquires an electronic receipt ID from the transaction file 26 included in the transaction response.

After finishing the processing of ACTS 51 to 53, the processor 41 proceeds to ACT 54. In ACT 54, the processor 41 acquires one piece of merchandise sales data from the transaction file 26 included in the transaction response. In ACT 55, the processor 41 executes merchandise registration processing on the merchandise sales data. That is, the processor 41 registers the number of items to be purchased included in the merchandise sales data, as the number of items sold of the merchandise item identified by the merchandise code included in the same merchandise sales data. The processor 41 also registers an amount calculated by multiplying the price by the number of items to be purchased included in the merchandise sales data, as the amount of sales of the merchandise item identified by the merchandise code included in the same merchandise sales data.

After finishing the execution of the sales registration processing, the processor 41 proceeds to ACT 56. In ACT 56, the processor 41 checks whether next merchandise sales data is included in the transaction file 26. If next merchandise sales data is included in the transaction file 26, the processor 41 returns to ACT 54. The processor 41 then executes the processing of ACTS 54 and 55 similarly to the above. That is, the processor 41 acquires merchandise sales data and executes the sales registration processing based on the merchandise sales data.

After finishing the execution of the processing of ACTS 54 and 55 for all the merchandise sales data included in the transaction file 26, the processor 41 proceeds to ACT 57. In ACT 57, the processor 41 acquires payment data from the transaction file 26. In ACT 58, the processor 41 generates receipt data. The receipt data is electronic data of a detailed receipt edited based on the transaction number acquired in the processing of ACT 51, the transaction start date and time acquired in the processing of ACT 52, the merchandise sales data acquired in the processing of ACT 54, and the payment data acquired in the processing of ACT 57. In ACT 59, the processor 41 controls the communication interface 45 to transmit the receipt data along with the electronic receipt ID acquired in the processing of ACT 53 to the electronic receipt server. Then, the processor 41 exits the sales integration processing.

In this way, as the processor 41 executes the sales integration processing, the sales registration processing based on the merchandise sales data in the transaction file 26 acquired from the mobile server 22 is executed at the POS terminal 11 functioning as a sales processing device. By this sales registration processing, the sales data of a commercial transaction settled by the mobile settlement system 20 is registered at the POS terminal 11. The sales data registered at the POS terminal 11 is gathered in the POS server 12 and integrated with the sales data of a commercial transaction settled by another POS terminal 11.

By the processing of ACTS 52, 54, and 57, the processor 41 performs the function of the first acquisition unit 63. By the processing of ACT 55, the processor 41 performs the function of the processing unit 64. By the processing of ACT 53, the processor 41 performs the function of the second acquisition unit 65. By the processing of ACTS 58 and 59, the processor 41 performs the function of the transmission unit 66.

As described above in detail, the POS terminal 11 functioning as a sales processing device executes information processing to take in the sales data of a commercial transaction settled by the mobile settlement system 20 and integrate the sales data into the sales data aggregated in the POS system 10. Consequently, the sales data of the commercial transaction settled by the mobile settlement system 20 can be integrated with the sales data of a commercial transaction settled by the POS terminal 11. Thus, the sales at the store using the POS system 10 and the mobile settlement system 20 in parallel can be easily grasped.

The POS terminal 11 functioning as a sales processing device also has the function of generating receipt data in an electronic form based on the data of a commercial transaction settled by the mobile settlement system 20 and transmitting the receipt data to the electronic receipt server. Thus, a purchaser performing registration of a merchandise item to be purchased and settlement of a commercial transaction by self-service, by operating the mobile terminal 21, can acquire a receipt showing details of the transaction in the form of an electronic receipt.

Incidentally, the POS terminal 11 functioning as a sales processing device processes sales data, using the price forming the merchandise sales data in the transaction file 26 acquired from the mobile settlement system 20. Therefore, even if the price of a merchandise item is changed before the POS terminal 11 takes in the transaction file 26 from the mobile server 22, the POS terminal 11 processes the sales data with the price before the change. Consequently, the sales at the store can be accurately grasped.

OTHER EMBODIMENTS

In the foregoing embodiments, the monitoring unit 62 controls the communication interface 45 to periodically transmit an inquiry command about a settlement-completed transaction to the mobile server 22. In another embodiment, the mobile server 22 outputs a signal indicating the completion of the commercial transaction, after the processing of ACT 12 according to the procedures shown in the flowchart of FIG. 5. This signal is transmitted from the communication server 32 to the inter-server network 30 and is received by the communication server 31. The POS terminal 11 functioning as a sales processing device monitors the communication server 31, and transmits the inquiry command to the mobile server 22 if it is detected that a signal indicating the completion of the commercial transaction is received. According to such another embodiment, the number of times the inquiry command about a settlement-completed transaction is transmitted is reduced and therefore the processing load of the POS terminal 11 functioning as the sales processing device can be reduced.

In the foregoing embodiments, the processor 41 of the POS terminal 11 functioning as a sales processing device performs the functions of the second acquisition unit 65 and the transmission unit 66. In another embodiment, a dedicated machine in charge of the processing related to the electronic receipt system is connected to the communication network 13 of the POS system 10. The processor 41 of the POS terminal 11 functioning as a sales processing device controls the communication interface 45 to transfer the data of the transaction file 26 to the dedicated machine in the processing of ACT 57 of the sales integration processing shown in FIG. 8. The dedicated machine acquires the user identification information identifying the user of the electronic receipt from the data of the transaction file 26 and transmits electronic data of a receipt showing details of the commercial transaction along with the user identification information to the electronic receipt server. According to such another embodiment, the POS terminal 11 functioning as a sales processing device no longer needs the processing related to the electronic receipt and therefore the processing load can be reduced further.

In the foregoing embodiments, any one of a plurality of POS terminals 11 functions as a sales processing device. In another embodiment, a computer having at least the functions as the monitoring unit 62, the first acquisition unit 63, and the processing unit 64 is connected to the communication network 13 of the POS system 10, and the sales data of a commercial transaction settled by the mobile settlement system 20 is integrated into the sales data aggregated by the POS server, using this computer. According to such another embodiment, the computer, which is less expensive than the POS terminal, can be used as the sales processing device and therefore the cost of equipment can be reduced.

While some embodiments of the present disclosure have been described, these embodiments are presented simply as examples and are not intended to limit the scope of the present disclosure. These novel embodiments can be implemented in various other forms and can include various omissions, replacements, and changes without departing from the spirit and scope of the present disclosure. These embodiments and modifications thereof are included in the scope of the present disclosure and also included in the scope of the claims and equivalents thereof.

What is claimed is:

1. A point of sale (POS) system, comprising:
a POS server configured to manage sales data of a store; and
a plurality of POS terminals in the store and configured to perform processing of commercial transactions at the store and transmit data of the commercial transactions to the POS server, wherein one of the POS terminals is connectable to a mobile settlement system including one or more mobile terminals and a mobile settlement server that is configured to store data of commercial transactions performed using the mobile terminals, each data including a first flag that indicates whether the corresponding commercial transaction has been settled and a second flag that indicates whether the data has been integrated into the sales data of the store managed by the POS server, and
the one of the POS terminals is configured to:
periodically transmit to the mobile settlement server an inquiry command about a commercial transaction performed using a mobile terminal, and
in response to receiving, from the mobile settlement server, data of a commercial transaction that includes the first flag indicating that the commercial transaction has been settled and the second flag indicating that the data has not been integrated into the sales data of the store,
generate sales data from the received data, and
transmit the generated sales data to the POS server, and
the inquiry command causes the mobile settlement server to update the second flag of the data of the commercial transaction to indicate that the data has been integrated into the sales data of the store.

2. The POS system according to claim 1, wherein
the one of the POS terminals is connectable to an electronic receipt server configured to manage receipt data, and
the one of the POS terminals is configured to generate receipt data corresponding to the received data and transmit the receipt data to the electronic receipt server.

3. The POS system according to claim 1, wherein the one of the POS terminals is configured to:
calculate a sales amount from the received data, and
include the calculated sales amount in the sales data to be transmitted to the POS server.

4. The POS system according to claim 1, wherein
each of the POS terminals stores a sales processing flag indicating whether to operate as a sales processing device, and
the one of the POS terminals is configured to, upon startup, read the sales processing flag and determine to operate as a sales processing device.

5. The POS system according to claim 1, wherein the one of the POS terminals is connectable to the mobile settlement server through communication servers that are connected to each other via an inter-server network.

6. The POS system according to claim 1, wherein one or more of the POS terminals are installed in a checkout lane of the store.

7. A store system, comprising:
a point of sale (POS) system including:
a POS server configured to manage sales data of a store, and
a plurality of POS terminals in the store and configured to perform processing for commercial transactions at the store and transmit data of the commercial transactions to the POS server; and
a mobile settlement system including:
one or more mobile terminals configured to perform processing for commercial transactions at the store, and
a mobile settlement server configured to store data of the commercial transactions performed using the mobile terminals, each data including a first flag that indicates whether the corresponding commercial transaction has been settled and a second flag that indicates whether the data has been integrated into the sales data of the store managed by the POS server, wherein one of the POS terminals is configured to:

periodically transmit to the mobile settlement server an inquiry command about a commercial transaction performed using a mobile terminal, and in response to receiving, from the mobile settlement server, data of a commercial transaction that includes the first flag indicating that the commercial transaction has been settled and the second flag indicating that the data has not been integrated into the sales data of the store, generate sales data from the received data, and transmit the generated sales data to the POS server, and the mobile settlement server is further configured to, after receiving the inquiry command, update the second flag of the data of the commercial transaction to indicate that the data has been integrated into the sales data of the store.

8. The store system according to claim 7, wherein the one of the POS terminals is connectable to an electronic receipt server configured to manage receipt data, and the one of the POS terminals is configured to generate receipt data corresponding to the received data and transmit the receipt data to the electronic receipt server.

9. The store system according to claim 7, wherein the one of the POS terminals is configured to:

calculate a sales amount from the received data, and include the calculated sales amount in the sales data to be transmitted to the POS server.

10. The store system according to claim 7, wherein each of the POS terminals stores a sales processing flag indicating whether to operate as a sales processing device, and the one of the POS terminals is configured to, upon startup, read the sales processing flag and determine to operate as a sales processing device.

11. The store system according to claim 7, further comprising:

a communication server by which the POS system and the mobile settlement system are connected.

12. The store system according to claim 7, wherein one or more of the POS terminals are installed in a checkout lane of the store.

13. A method performed by one of a plurality of point of sale (POS) terminals installed in a store to perform processing for commercial transactions at the store and transmit data of the commercial transactions to a POS server, the method comprising:

connecting to a mobile settlement system including one or more mobile terminals and a mobile settlement server that is configured to store data of commercial transactions performed using the mobile terminals, each data including a first flag that indicates whether the corresponding commercial transaction has been settled and a second flag that indicates whether the data has been integrated into sales data of the store managed by the POS server;

periodically transmitting an inquiry command about a commercial transaction performed using a mobile terminal to the mobile settlement server; and in response to receiving, from the mobile settlement server, data of a commercial transaction that includes the first flag indicating that the commercial transaction has been settled and the second flag indicating that the data has not been integrated into the sales data of the store, generating sales data from the received data; and transmitting the generated sales data to the POS server, wherein the inquiry command causes the mobile settlement server to update the second flag of the data of the commercial transaction to indicate that the data has been integrated into the sales data of the store.

14. The method according to claim 13, further comprising:

connecting to an electronic receipt server configured to manage receipt data;

generating receipt data corresponding to the received data; and transmitting the receipt data to the electronic receipt server.

15. The method according to claim 13, further comprising:

calculating a sales amount from the received data; and including the calculated sales amount in the sales data to be transmitted to the POS server.

16. The method according to claim 13, further comprising:

storing a sales processing flag indicating that the one of the POS terminals operates as a sales processing device; and upon startup, reading the sales processing flag and determining to operate as a sales processing device.

17. The method according to claim 13, wherein connecting to the mobile settlement system includes connecting to a communication server that is connected to the mobile settlement system.

\* \* \* \* \*